United States Patent [19]

Mirdadian

[11] 4,120,032
[45] * Oct. 10, 1978

[54] METHODS AND SYSTEMS FOR USE WITH PULSE TRAIN CIRCUITRY

[76] Inventor: Mohammad Kian Mirdadian, 7015 Atwell, Houston, Tex. 77036

[*] Notice: The portion of the term of this patent subsequent to Jul. 26, 1994, has been disclaimed.

[21] Appl. No.: 794,415

[22] Filed: May 6, 1977

Related U.S. Application Data

[63] Continuation of Ser. No. 553,834, Feb. 27, 1975, Pat. No. 4,038,534.

[51] Int. Cl.² .................... G01F 1/08; G01F 15/02
[52] U.S. Cl. ........................... 364/510; 235/92 FQ
[58] Field of Search ........... 235/151.34, 151.3, 92 FL, 235/92 EC, 92 CA, 92 FQ; 73/194 EM, 194 M, 3, 1 F

[56] References Cited

U.S. PATENT DOCUMENTS

| | | | |
|---|---|---|---|
| 3,588,481 | 6/1971 | Stroman | 235/151.34 |
| 3,614,892 | 10/1971 | Ottenstein | 235/151.34 X |
| 3,699,320 | 10/1972 | Zimmerman et al. | 235/151.34 |
| 3,711,689 | 1/1973 | Park | 235/151.34 |
| 3,808,407 | 4/1974 | Ratz | 235/92 FQ |
| 3,831,011 | 8/1974 | Hulme | 235/151.34 |
| 3,868,498 | 2/1975 | Guggenbuhl | 235/151.3 |
| 4,038,534 | 7/1977 | Mirdadian | 235/151.34 |

Primary Examiner—Edward J. Wise
Attorney, Agent, or Firm—Browning, Bushman & Zamecki

[57] ABSTRACT

Disclosed are apparatus and methods for determining the actual, standardized volume of fluid flowing in a flowline. A flow meter in the line measures volume and provides the measured value in the form of a pulse train. Compensating means change the number of pulses in the pulse train as required to compensate for the difference between the actual fluid temperature and a standard reference temperature. The pulse train is also compensated to correct for meter error. Digital verification means are provided for verifying that the compensating means are working properly. In the methods, an input counter connected to the input of a circuit in the system is gated to start counting pulses applied into the circuit while an output counter is simultaneously gated to start counting the pulses out of the circuit. At the end of the test period, the input and output counts and other known input values are employed as the variables in a mathematical equation representing the circuit function. Balancing of the equation using these variables verifies that the circuit is operating correctly. The method and apparatus may be employed to verify proper operation of other digital computing circuits or to establish a comparative relationship between a plurality of electrical pulse train producing means.

12 Claims, 1 Drawing Figure

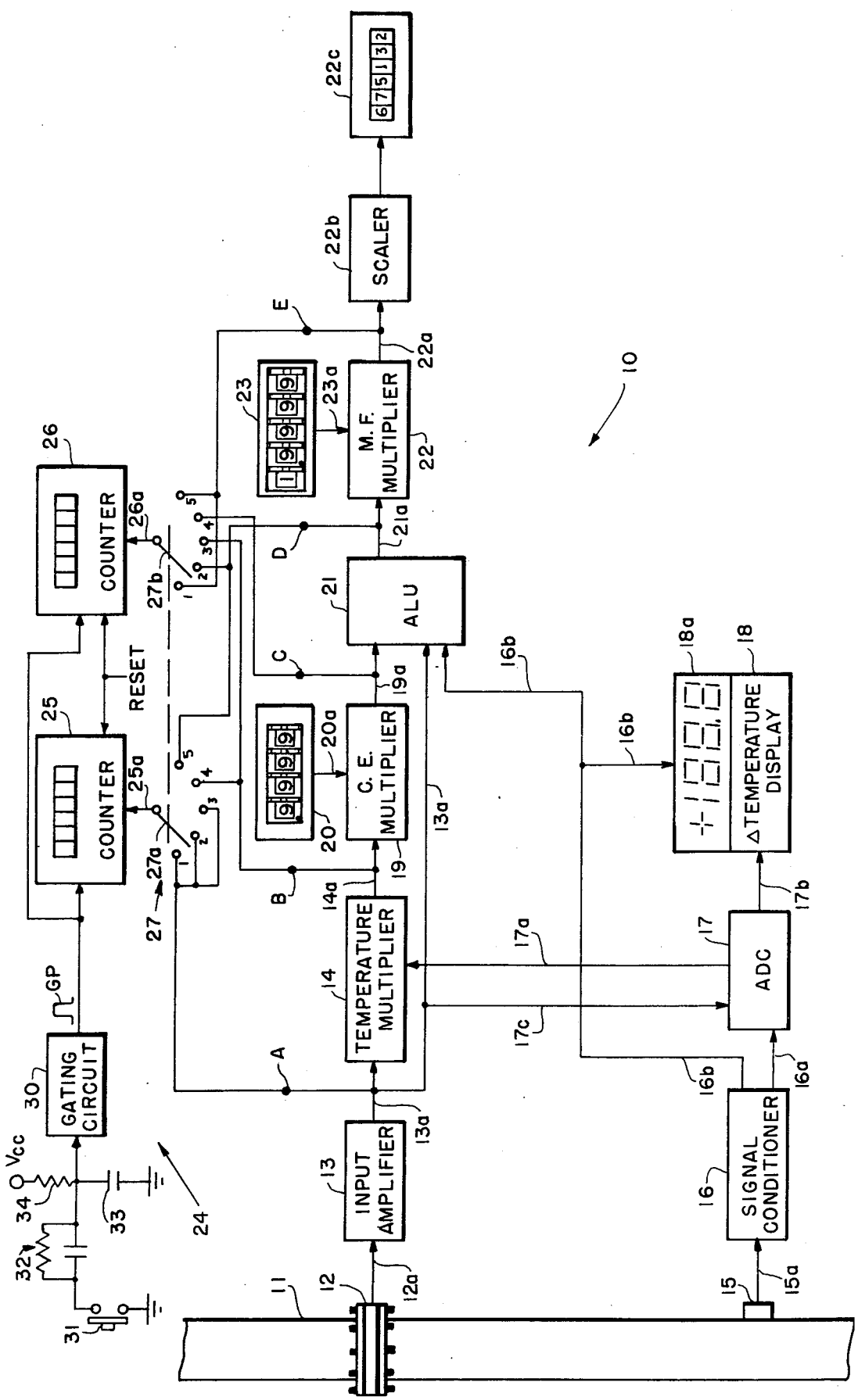

METHODS AND SYSTEMS FOR USE WITH PULSE TRAIN CIRCUITRY

This is a continuation of application Ser. No. 553,,834, filed Feb. 27, 1975, and issued July 26, 1977 as U.S. Pat. No. 4,038,534.

BACKGROUND OF THE INVENTION

In its broader applications, the field of the present invention relates to means for verifying proper operation of electrical computing circuitry employed for pulse train manipulations or for establishing a comparative relationship between plural pulse train generating means exposed to similar inputs. The invention also relates to the measurement of variable parameters. In a particular application described herein, the present invention relates to systems and methods for measuring the volume of fluid flowing in a flowline, compensating for various factors which affect the measurement, and verifying proper functioning of the compensating means.

The prior art is replete with systems for measuring fluid flow in a flowline. Many of such systems are capable of automatically compensating for changes in various parameters of the fluid, such as pressure and temperature, which may affect the measurements. Such compensation provides a corrected and standardized output value for the measured fluid volume. Corrections are required because of errors in the flow meter operation. Standardization is required since the volume of liquids varies with changes in temperature and the volume of gases varies with both temperature and pressure. Standard U.S. volume measurements of petroleum fluids are currently based on a temperature of 60° F. and atmospheric pressure at sea level. As used herein, the term fluid is intended to encompass both liquids and gases.

Certain of the prior art systems employ a flowmeter to measure flow rate through the metered flowline and transducers to measure the temperature of the fluid. The flowmeters are generally of the type which generate a series of pulses at a frequency which is representative of a measured volume of fluid. An output device counts the pulses to determine the volume. In one prior art system, the temperature transducer output is employed to increase or decrease the frequency of the pulses supplied to the output device from the flowmeter. The output device counts the number of resulting pulses to provide a temperature standardized value for volume.

One prior art system compensates for temperature effects by adding a burst of high frequency pulses to the square wave pulse train being emitted from the flow meter. The high frequency pulses are timed to occur in the period between two adjacent square wave pulses. The output device totals the high frequency pulses as well as the lower frequency square wave pulses to obtain the compensated volume. The required sensitivity of the output device to high frequency signals makes the system susceptible to noise. Efforts directed toward reducing noise distortion increase the complexity and expense of the compensating circuitry. Moreover, the requirement for inserting the high frequency bursts into the interval between adjacent square wave pulses places a practical upper limit on the square wave pulse rate. If the pulse rate is too high, not enough time between adjacent pulses is available for insertion of a relatively large number of compensating spikes.

In the petroleum industry, accurate measurement of petroleum fluids is of great economic importance which explains the need for compensation devices. The loss or addition of even a single pulse in a pulse train may affect the output reading of the metering system by a substantial amount. To ensure accurate measurement, the compensating devices must be periodically tested. If the measuring function of the system must be interrupted during testing, important economic loss may result. Testing is also an expensive requirement where sophisticated test equipment and experienced technical personnel are required to perform the tests. Conventional systems which insert a burst of high frequency pulses between square wave pulses are extremely difficult and expensive to test.

SUMMARY OF THE INVENTION

All of the inputs to the system of the present invention, such as temperature and coefficient of expansion, are converted into or supplied to the system in digital form. The system itself is physically arranged so that discrete circuits perform a desired mathematical function. The combination of these circuits in the system produces a series of mathematical functions which convert the metered input value for flow to a temperature standardized, meter error corrected, value.

The provision of an all digital system with separate circuits performing specific, known mathematical operations permits the system and its individual circuits to be quickly and easily tested for proper operation by unskilled personnel using simple calculators or manual calculations. Additionally, the described design approach permits the system to be easily tailored to suit specialized applications. Thus, where the same fluid is always flowing through the line, there is no need to correct for a variable coefficient of expansion and this circuit and its function may be deleted without re-engineering the system. Other functions, such as pressure compensation, may just as simply be added without need for extensive design changes.

Verification of proper operation of the temperature compensating means of the present invention is effected by connecting an input prover or gross counter to the input to the compensating means and an output prover or net counter to its output. The two counters are interconnected to start and stop counting simultaneously and to count independently. If the system is functioning properly, the net count will differ from the gross count by a factor having a value dependent upon the temperature correction. Established tables may be consulted to provide the coefficient of expansion for the fluid being metered. Given the temperature of the fluid, by either manual calculation or with the use of a simple calculating device, the gross count is multiplied by the coefficient of expansion. The result of this multiplication will be equal to the count in the net counter if the compensating circuit is functioning properly.

While the invention has been described for use with a temperature compensation circuit, it will be appreciated that it may also be used with other digital calculating circuit means having known functional relationships between the input and output signals.

The verification equipment of the invention monitors the metering and compensating means without interrupting normal metering operations. Thus, no shutdown time is required to test the equipment.

In one form of the invention, the gross counter may be employed to count the input signal applied to a temperature multiplier unit, a coefficient of expansion multiplier unit or a meter factor multiplier unit. The second counter may be connected to monitor the output signals generated by the temperature multiplier unit, the coefficient of expansion multiplier unit, an Arithmetic Logic Unit or the meter factor multiplier unit. The gross counter display for a given period of time should be functionally related to the net counter display by the mathematical operations employed in the subcircuits or units included between the two counters. Each multiplier unit may be checked individually, or the entire system may be checked.

An important feature of the present invention is that the pulse stream supplied to the output device contains only square wave pulses. Since it is not necessary to insert a compensating burst of high frequency pulses into the pulse train as is necessary with certain of the prior art designs, conventional high frequency noise filters may be used in the system of the present invention so that noise spikes may be prevented from producing faulty readings in the output device. The use of a uniform square wave pulse train without need for inserting signals between adjacent pulses makes it possible to employ higher operating frequencies with the system of the present invention.

In operation, the system of the invention modifies the output pulse stream to form a compensating pulse stream by continuously subtracting square wave pulses from the train to reflect the effect of the variable parameters. This compensating pulse stream is then combined with the original gross output pulse train to provide a net pulse train which is supplied to the end output device to show the standardized corrected volume of fluid flowing through the flowline. Because of the continuous nature of the compensation or correction, a very large number of corrections or compensations may be included in the system without unduly increasing the frequency of the pulse train supplied to the output device and without altering the square wave form of the signal.

The system of the present invention operates on digital pulse trains using binary-coded-decimal (BCD) input values so that the system is directly compatible with any conventional digital computer without need for special interfacing equipment. The signals in the system may also be provided as BCD output signals for use with conventional digital equipment. This is true with respect not only to the output signal from the system but also with respect to the signal at the output of each individual subcircuit forming the system. If desired, system input and output values may be communicated in digital form between the system and a remotely located digital computer or other digital equipment which even further enhances the flexibility of the system.

One of the important features of the present invention is the provision of means for simultaneously gating the input and output counters when a verification count is initiated and stopping the counters simultaneously when the count is over. This simple expedient ensures that the input and output count are taken over the same time period. A gate delay circuit is employed to form a clean gating pulse to the counters, free of switch bounce or other mechanically induced noise. Simultaneous gating is effected by employing a common gate delay circuit for both counters. By this means, the discrepancies between capacitors, resistors and supply voltages in two separate gate delay circuits are eliminated so that the two counters are gated at precisely the same time. It will be appreciated that this technique for verifying operation of a digital circuit may be applied to any digital circuit and is not limited to its described application for verifying proper operation of the circuitry in a temperature compensation system.

The gate delay circuit is also provided with circuit means which provides a single, fixed duration square wave pulse to the delay circuit whenever the mechanical count-initiate switch is depressed, regardless of the speed at which the switch is opened and closed and regardless of whether the switch is manually held in closed position for a prolonged period of time. By this means, the gating of the two counters is made independent of variations in the closure time of the count-initiate switch.

Another important feature of the invention is that proper operation of the system or individual portions of the system may also be verified quickly, without need for shutting down the measuring function of the system or diverting the fluid to a secondary metering system. This is accomplished in part by digitizing all analog functions, arranging the circuits so that their individual inputs and outputs are connectable into the proving counters, providing for specific mathematical manipulations in each circuit section and providing digital decimal displays for the two counters and for $\Delta T$ as well as for the inputs for coefficient of expansion, meter factor and any other variable parameters affecting the net count.

The temperature of the metered fluid is periodically compared against a reference temperature to obtain a $\Delta T$ value which in turn is converted to BCD form and supplied to a multiplying circuit in the compensation system. The BCD signal which is applied to the multiplier is also supplied to a digital display so that the value of $\Delta T$ being used in the multiplier is visually displayed and may be compared with the value of $\Delta T$ obtained by manual testing. Since the converted multiplier value rather than the analog output value of the temperature transducer is displayed, proper operation of the BCD converting means is also verified during the test.

Other features, objects and advantages of the present invention will become more readily apparent from the accompanying drawing, specification and claims.

BRIEF DESCRIPTION OF THE DRAWING

The FIGURE illustrates a block diagram of the compensating system of the present invention.

DESCRIPTION OF THE ILLUSTRATED EMBODIMENT

Referring now to the drawing, the compensating totalizer system of the present invention is indicated generally at 10. The system 10 is used for measuring the volume of fluid flowing in a flowline 11, standardizing the measurement to a selected value of temperature and correcting for abnormalities in the metering device. The system includes a conventional flowmeter 12 which may be a turbine meter or positive displacement meter or any other suitable metering or measuring device capable of indicating the amount of fluid moving through the pipeline. In the system of the present invention, the flowmeter 12 is preferably of the type which generates an electrical square wave pulse representative of the passage of a known incremental volume of fluid through the pipeline. These pulses from the flowmeter provide a first digital signal which is supplied via conductor 12a to an input amplifier 13 which amplifies the signals and electrically isolates the rest of the system from the flowmeter.

The output of amplifier 13 is connected via conductor 13a to the input of a temperature multiplier unit 14. A test point A is electrically connected to conductor 13a to provide a means for monitoring the output of the amplifier 13. The temperature multiplier 14 is also supplied with a binary-coded-decimal (BCD) signal representative of a change in the temperature ($\Delta T$) of the fluid in the flowline as measured by a conventional temperature transducer 15. The transducer 15, which is disposed in the flowline 11, continuously measures the fluid temperature and generates a representative analog output signal. The analog signal is applied via conductor 15a to a signal conditioner 16 which compares the analog signal to a preselected signal representative of standard temperature. Any suitable conventional means may be employed for the conditioner 16. In the illustrated embodiment, the reference temperature is 60° F. which is the temperature used in the oil industry as a standard for volume measurements.

The signal conditioner 16 generates two output signals, one of which is supplied to a conventional analog-to-digital converter (ADC) 17 via conductor 16a. The signal on line 16a is an analog signal, the amplitude of which is representative of the magnitude of the change in temperature ($\Delta T$) from the reference temperature of 60° F. The second output from the signal conditioner 16, on a line 16b, is indicative of the sign (plus or minus) of the temperature change from the reference temperature.

The ADC 17 converts the analog $\Delta T$ signal from the signal conditioner 16 to a BCD $\Delta T$ signal which is supplied by a conductor 17a to the temperature multiplier unit 14 and to a $\Delta T$ temperature display unit 18 by conductor 17b. A line 17c provides the gross pulse signal to the ADC 17 so that the signal on line 17a may be updated each time a selected number of pulses in the gross pulse signal occurs, for example 1000 pulses.

The $\Delta T$ temperature display unit 18 is conventional and employs readout devices 18a to visually display the change in fluid temperature with respect to the reference temperature. By way of example, at 60° F., the temperature display 18a would indicate 0° F.; at 125° F., +65° F. would be displayed and at 0° F., −60° F. would be displayed. The plus and minus sign in the display device 18a is generated by the signal conditioner 16 and supplied to the display unit 18 by the conductor 16b.

As previously mentioned, the BCD $\Delta T$ output signal from the ADC 17 on the line 17a is applied to the temperature multiplier unit 14. The multiplier 14 is conventional and functions such that the BCD $\Delta T$ value is multiplied with the flowmeter pulse train signal on line 13a. The resulting output signal from the multiplier 14 is a digital, temperature-compensated, square wave pulse train representative of the flowmeter signal value multiplied by the BCD $\Delta T$ signal value. The multiplier circuit 14 is similar to other multiplier circuits in the system 10 and functions to manipulate or alter the pulse train supplied to its input according to a particular mathematical equation. In the case of the circuit 14, the equation is simply:

$$P_o = P_i \Delta T (0.01)$$

where:

$P_o =$ the number of pulses in the output pulse train over a selected interval;
$P_i =$ the number of pulses in the input pulse train over the same interval; and
$\Delta T =$ the absolute value of the temperature difference between the actual fluid temperature and the reference temperature.

Thus, it may be appreciated that, in general terms, the pulse train $P_i$ is continuously altered according to a specified mathematical equation in an amount dependent upon the value of one or more variable mathematical factors ($\Delta T$) employed in the Equation. In operation, the variable factor values are provided as BCD inputs to the circuit performing the mathmetical operation. Pulses in the input pulse train are subtracted by the circuit over the given interval in an amount dependent upon the particular mathematical operation being performed by the circuit. While the circuit 14 performs multiplication, other operations such as division, subtraction or addition may also be performed.

Standardization of the volume reading for the system 10 requires that the coefficient of expansion for the metered fluid be taken into consideration. This coefficient and the temperature of the fluid relative to the selected standard temperature are employed in obtaining the temperature standardized volume from the metered volume. A second multiplier unit 19 is utilized to compensate for the coefficient of expansion of the fluid being metered. The output signal from the multiplier 14 is applied by a conductor 14a to the unit 19. A test point B is electrically connected to the output conductor 14a. The coefficient of expansion is obtained from a reference table and manually entered by unit 20 as one input to the multiplier 19. The unit 20, which is a conventional thumbwheel switch, displays the number entered and converts the value to a BCD form for entry into the multiplier 19. The temperature compensated digital signal on the line 14a provides the second input and the product of the two inputs is formed on the line 19a. The unit 19, like the unit 14, may be any suitable conventional electronic multiplying circuit which, when provided with digital inputs provides a digital output pulse train representative of the product of the inputs. This output generated by the unit 19 is a net compensation signal which is supplied as one input to a conventional arithmetic logic unit (ALU) 21 by a conductor 19a. A test point C is electrically connected with the output line 19a.

The ALU 21 also receives as inputs, the gross flowmeter output signal from the amplifier 13 and the sign (plus or minus) signal from the signal conditioner 16. When the signal on the line 16b indicates a negative value for $\Delta T$, the ALU 21 algebraically adds the net compensation signal to the gross flowmeter signal. When the signal on line 16b indicates a positive value for $\Delta T$, the net compensation signal is subtracted from the gross flow meter signal. The resulting output from the ALU represents the net standardized volume for the volume of fluid metered in the flowline.

The output of the ALU 21 is supplied to a meter factor multiplier unit 22 by a conductor 21a. A test point D is electrically connected to the line 21a. The meter factor multiplier corrects for errors in the meter 12. In the system 10, the meter factor is determined by dividing: (a) the number of pulses P(1) actually produced on the line 12a for a known volume of fluid traveling through the meter 12 into (b) the number of pulses P(2) which should have been produced for such known volume according to the manufacturer's specifications for the meter. This meter factor is manually entered through the unit 23 as one input to the multiplier 22. The unit 23 converts the meter factor value, in a conventional manner, to a BCD signal on the line 23a. The multiplier 22, like multipliers 14 and 19, multiplies the two signals together and provides a digital output representative of the product. This product, which is provided on the line 22a, is the factored net output signal for the system in digital form. A test point E is electrically connected to the line 22a. The signal on line 22a is also provided to a conventional scaler 22b which interfaces with a conventional output display register 22c. The register 22c provides a visual display of the temperature standardized volume of the metered fluid corrected for meter abnormalities.

Since proper operation of the totalizer system 10 may be of great economic importance, a verification circuit 24 is included in the system 10 to provide a simple and quick check of the system. The verification circuit 24 includes an input or gross counter 25 and an output or net counter 26. An input 25a to the gross counter may be selectively connected to the test points A, B, and D by a selector switch 27a. The net counter has an input 26a which is selectively connected by selector switch 27b to the test points B, C, D, and E. In the illustrated system, the switches 27a and 27b are ganged for simultaneous movement. By moving the selector switches to the appropriate position, the counters 25 and 26 will be connected across the system 10 or across one or more of the multipliers in the system. Thus to check multiplier 14, the switches 27a, 27b are set to switch position 3; to check multiplier 19, they are set to position 4; to check multipliers 14 and 19 and ALU 21, they are set to position 2; to check multipliers 14, 19 and 22 and the ALU 21, they are set to switch position 1.

The counters 25 and 26 are interconnected to gate on and off simultaneously and to count independently. The counters 25 and 26, which are conventional, include means for resetting to zero and begin counting when they receive a first electrical gate pulse G.P. The counters stop counting when they receive a second gate pulse. The accumulated count in each counter is presented as a visible, digital display. If desired, the counters may be connected to be reset with the first gate pulse or to be provided with other means for starting or stopping the count operation. In the preferred form of the invention, a gating circuit 30 is employed to form a gate pulse which has a fixed amplitude and duration and is free from noise and distortion. Direct mechanical switching for starting and stopping the counters is preferably avoided since the gate pulse generated from the closing (or opening) of a mechanical switch may have a high frequency noise component which may cause the counters to rapidly turn on and off. Loss or addition of even a single pulse to the count in either counter may be significant. While counters are customarily provided with an electrical circuit for producing a clean gate pulse following actuation of a mechanical switch, the gate pulses in two different counters are not necessarily identical. Differences in the timing circuit component values or the supply voltages may cause identical counters to produce gate pulses which are sufficiently dissimilar to cause the two counters to start or stop at slightly different times even though both are connected to the same switching means.

One of the important features of the present invention is the provision of means for initiating or stopping the count in counters 25 and 26 with the very same gate pulse. Since the identical pulse is used to control operation of both counters, the counts start and stop simultaneously.

In the FIGURE, a mechanical switch 31 is closed to form the gate pulse G.P. A parallel RC timing circuit 32 cooperates with the charging capacitor 33 and resistor 34 to provide a momentary pull-down circuit. The pull down circuit supplies a pulse to the gate circuit when the switch 31 is closed. The pulse width is dependent upon the component values in the circuit 32 and is not affected by the length of time that the switch is held in the closed position. If desired, the circuit may be modified to produce the pulse supplied to the circuit 30 when the switch 31 is opened rather than when it is closed.

The procedure for checking a multiplier unit for proper operation involves resetting both counters, setting the selector switch 27a, 27b to the appropriate position and depressing the switch 31 which allows the counters to simultaneously start counting input and output pulses. At any desired time, the switch 31 is closed again to stop both counters simultaneously. At the end of the counting period, the values displayed by the counters are compared. Where a two input multiplier is being checked, the value in the net counter divided by the gross counter value will be equal to the multiplication factor entered in the second input to the unit if the multiplier is working accurately. This test is conducted while the normal metering function of the system continues. Any suitable circuitry or devices capable of performing the described functions for the various components may be employed in the circuit 10. The meter multipliers, ALU unit, counters, scaler, register and other circuits and devices described with reference to the present invention are conventional and, per se, form no part of the invention except as they are used in the described combination.

Theory and Examples of Operation

In the system 10, it is desirable to use digital signals in the compensating circuitry in order to reduce error and to make the system operation more comprehensible to operators charged with the responsibility of verifying the correctness of the system's operation. The meter output is thus preferably digital in form and the temperature probe output is converted to digital form. Where other type transducers are employed to provide volume, or where additional parameters, such as pressure, are being monitored, the outputs of such transducers are preferably digitized to be compatible with the system.

The system 10 performs the temperature correction by solving the following equation:

$$\text{NET} = \text{GROSS}[1 + (60-T)(0.01)(\text{C.E.})](\text{M.F.}) \qquad (1)$$

where:
T = the temperature in degrees Fahrenheit of the fluid to be measured
C.E. = Coefficient of Expansion for the fluid, expressed in percent per degree Fahrenheit
M.F. = the meter factor of the flow rate transducer
NET = the standardized pulse signal corrected for temperature and meter factor effects
GROSS = The pulse signal obtained from the flow transducer.

Equation (1) may be rewritten as follows:

NET = M.F.[GROSS +
GROSS(|60−T|)(0.01)(C.E.)] for T<60° F.; and  (2)

NET = (M.F.)(GROSS) for T = 60° F.; and  (3)

NET = M.F.
[GROSS-GROSS(|60−T|)(0.01)(C.E.)] for
T>60° F.

Referring to the system functional diagram 10, the fluid temperature is transmitted to the signal conditioner 16 where it is linearized and subtracted from a 60° F. reference. The output signal on line 16a is a voltage proportional to |60−T|. The signal conditioner also determines whether the temperature is greater or less than 60° F. and provides an appropriate signal on the line 16b. Any suitable conventional circuitry may be employed to provide the function of the conditioner 16. The analog to digital converter 17 accepts the absolute value of the temperature difference from 60° F. ($\Delta T$) and converts the voltage signal to a three digit Binary Coded Decimal (BCD) number. The conversion preferably occurs every 1000 gross input pulses. The gross signal on the line 13a may be employed as a check for the ADC 17. As an additional operational check and maintenance function, a 3-digit digital display 18a with sign, is provided to monitor $\Delta T$. In this manner, the unit may be checked to ensure that the proper temperature is being measured at all times.

The temperature multiplier 14 accepts the gross pulses from the amplifier 13 and multiplies by ($\Delta T$)(0.01) in BCD form. Since this is a digital multiplication, the product is represented by a serial pulse train.

EXAMPLE 1

As an example, consider $\Delta T = +45.6°$ F., and 1000 gross pulses. The value of $\Delta T$ is multiplied by 0.01 by shifting the decimal point two places to the left therefore the input to the temperature multiplier is 0.456. For 1000 input pulses, 456 pulses are gated out of the multiplier 14 representing the product of (gross pulses)($\Delta T$)(0.01). An operator attempting to verify that the system is operating correctly may permit the input counter connected to point A to count to 1000. Knowing that $\Delta T$ is +45.6° F. (by simply reading the display 18a), the operator may manually multiply (1000)(45.6)(0.01) to obtain 456. If the unit 14 is functioning correctly, the output counter should read 456. By taking a manual temperature reading and calculating $\Delta T$, operation of the temperature transducer 15 and the ADC converting system 17 may be tested since the calculated value should correspond with the value displayed at 18a if the components are working correctly.

The coefficient of expansion multiplier 19 operates in the same manner as the temperature multiplier 14. It accepts the output of the temperature multiplier and multiplies by the coefficient of expansion which is entered by thumbwheel switches in the unit 20. The coefficient of expansion is obtained, for example, from ASTM D 1250, Table 6, for the fluid being measured and is entered in percent per ° F. The output on line 19a of the coefficient of expansion multiplier 19 represents the "compensation flow" that must be added or subtracted from the gross input on line 13a, depending on the sign of $\Delta T$. The arithmetic logic unit 21 accepts the gross flow and either adds or subtracts the compensation flow as required. The meter factor multiplier accepts the net flow output on line 21a from the ALU and multiplies it by the number input on the meter factor thumbwheel switches in the unit 23. The meter factor is derived by "proving" the metering system. In the system 10, the meter factor may vary from 0.0001 to 1.9999.

As an example of the complete system operation consider the following Examples:

EXAMPLE II

Assume:
(a) 100 gross barrels flow through the flowline and the flow meter 12 produces 1000 pulses/barrel or a total of 100,000 gross pulses.
(b) The fluid is 40° API;
(c) the fluid temperature is 50° F.; and
(d) the meter factor is 1.0026.
To calculate the net barrels measured, the formula used is:

Net = GROSS[1 + (|60−T|)(0.01)(C.E.)](M.F.) =
100[1 + (10)(0.01)(0.0472)](1.0026)  (1)

(The C.E. figure of 0.0472 is obtained from the previously referred to Table 6 of the ASTM).

NET = 100.7332 BBLS.
= 100,733.2 Pulses.

In the Temperature Compensating Totalizer, the following values are used:
T = −10.0 (Equation 2 applies)
C.E. = 0.0472
M.F. = 1.0026
The output of the temperature multiplier = (100,000)(10)(0.01) = 10,000 pulses
The output of the C.E. Multiplier = 10,000 × 0.0472 = 472 pulses
The output of the ALU = 100,000 + 472 = 100,472 pulses
The output of the M.F. = 100,472 × 1.0026 = 100,733 pulses.

This value corresponds with the result obtained from Equation 1. At each test point, a counter should show the calculated values if the system is working correctly.

EXAMPLE III

Assume:
(a) 100 gross barrels at 1000 pulses/barrel = 100,000 pulses;
(b) 60° API Product at 70° F. ($\Delta T = +10$ and Equation 4 applies)
(c) Meter factor = 0.9987;
(d) C.E. = 0.0621.
Using Equation (4)

Net = M.F.[GROSS-GROSS(|60−T|)(0.01)(C.E.)]
= 0.9987[100,000−100,000(10)(0.01)(0.0621)] =
99,249.807 Pulses.  (4)

Output of Temperature Multiplier = (100,000)(10)(0.01) = 10,000 pulses
Output of the C.E. Multiplier = (10,000)(0.0621) = 621 pulses
Output of the ALU = 100,000 − 621 = 99,379 pulses
Output of the M.F. Multiplier = (99,379)(0.9987) = 99,249 pulses From the foregoing, it may be appreciated that the system of the present invention permits technically unskilled operators to quickly and easily test for proper operation of one or more compensating devices in a measuring circuit using only simple, inexpensive instruments and without having to stop the measuring operation of the system. The system is broken into discrete sections each of which provides a customary mathematical function. Electrical access points are provided to the input and output of each section so that the pulses coming into and leaving each section can be separately counted. The system is designed to employ digital signals so that the input and output values of each section may be directly entered into a mathematical equation without need for conversion to a different notation.

The check for each section of the system requires only that the digital values of the inputs and the output be known over a given period of time. These values are used in the known mathematical relationship relating the inputs of the section to its output to verify proper operation of the section. In a two input multiplication section, the one measured input would be manually multiplied by the known second input to obtain the output value. This output value must be the same as that shown on the output counter if the section is functioning properly. Where more than one section is being tested, the input showing on the input counter is mathematically manipulated in a manner corresponding to the mathematical functions performed by each included section using the known input values to these sections. The result achieved by the manual calculation must correspond with the values shown on the output counters. Obviously, the figures may be manipulated for verification against the input counter value or the value of other inputs such as $\Delta T$, C.E. or M.F.

While the two-counter verification system has been described in a method and as a part of a system for verifying the proper operation of electrical circuits used to correct and standardize a volume measurement, the invention is of broader applicability. Generally speaking, the two-counter system may be used to test operation of any digital computing circuit of the type in which input data in the form of an input pulse train is supplied to the circuit input and pulses are added to or removed from the input pulse train according to a known formula so that the resulting output pulse train supplied to the circuit output is representative of the application of the formula to the input data. To this end, the input counter is connected to the circuit input and the output counter is connected to the circuit output. The gating system described previously ensures simultaneous starting and stopping of both counters.

In yet another application, the two counters may be connected to two independent sources of pulse train signals to determine the relationship between the two sources. For example, one counter may be connected to a master flow meter having a known relationship between the number of pulses produced for a given volume of fluid flowing through the meter and the second counter may be connected to a meter which is to be tested against the master meter. If the same volume of fluid is passed through both meters, both should produce the same number of pulses. By simultaneously gating the two counters as fluid flows through a pipeline into which both meters are connected, the pulse output from each counter may be determined for the same volume of fluid. The two pulse counts may be used to obtain a comparative relationship, or meter factor, for the second meter.

The foregoing disclosure and description of the invention is illustrative and explanatory thereof, and various changes in the steps as well as in the details of the described construction and method may be made within the scope of the appended claims without departing from the spirit of the invention. By way of example rather than limitation, the system components may be rearranged to suit any requirement. Thus, the meter factor multiplier 22 may be positioned between the input amplifier and the temperature multiplier 14. Similarly, while a particular formula or equation has been given for the circuit system 10, other formulas may also be employed without departing from the scope of the present invention. The system could, for example, be designed to meter gas with the system output being compensated for such things as pressure, temperature, coefficient of expansion, caloric content and other parameters or variables. It will also be appreciated that one aspect of the method and system of the present invention contemplates the counting of the number of pulses into a given circuit over a selected counting interval and the counting of the number of pulses out of the same circuit during the same interval. While two separate counters may be employed for this purpose, it will be appreciated that the input and/or output signals may be recorded so that a single counter may be employed to count the two signals at different times. This may be effected for example by counting the input while simultaneously recording the output and thereafter counting the output from the recording. The important requirement is that both counts be taken over the same interval.

I claim:

1. A system for simultaneously obtaining pulse counts from first and second electrical pulse train producing means comprising:
   (a) a first counter for counting the pulses in the pulse train produced by said first means;
   (b) a second counter for counting the pulses in the pulse train produced by said second means;
   (c) gating means actuatable at random for simultaneously starting the counting operation of said first and second counters, and actuatable at random for simultaneously stopping said counting operation of said first and second counters; and
   (d) display means for displaying the accumulated counts in said first and second counters when said counting operations have been so simultaneously stopped.

2. A system as defined in claim 1 wherein:
   (a) said first and second counters include means responsive to electrical gate pulses for starting their counting operation; and
   (b) said gating means includes a gate delay circuit which is actuatable to provide fixed length electrical gate pulses to said first and second counters.

3. A system as defined in claim 2 wherein said gating means includes means for simultaneously applying the same gate pulse to both said first and second counters for ensuring simultaneous starting of both counters.

4. A system as defined in claim 2 wherein:
   (a) said first and second counters include means responsive to electrical gate pulses for stopping their counting operation; and
   (b) said gating means includes means for simultaneously applying the same gate pulse to both said first and second counters for ensuring simultaneous starting and stopping of both counters.

5. A system as defined in claim 2 wherein said gating means further includes a momentary pull-down circuit means operable upon closure or opening of a mechanical switch, and independent of the length of time the switch remains in such closed or opened position, for providing a fixed duration electrical pulse for activating said gating means.

6. A system for determining the meter factor of a metering device comprising:
   (a) a first counter for counting electrical pulses generated in response to said metering device functioning in a measuring operation;
   (b) a second counter for counting electrical pulses generated in response to a standard measuring device functioning in a measuring operation;
   (c) gating means for simultaneously starting said first and second counters counting, and for simultaneously stopping said first and second counters counting; and
   (d) display means for comparing the counts on said first and second counters to evaluate said meter factor.

7. A system as defined in claim 6 wherein said standard measuring device is a master meter calibrated to determine its meter factor.

8. A system as defined in claim 6 wherein said metering device is a fluid flow meter installed on a pipeline for measuring fluid flow therethrough, and said standard measuring device is connected in series with said fluid flow meter on said pipeline for so determining said meter factor.

9. A system as defined in claim 6 wherein said metering device is a fluid flow meter, installed on a pipeline for measuring fluid flow therethrough.

10. A method of obtaining a meter factor for a meter device comprising the steps of:
    (a) providing a standard measuring means, connected in series with said meter device;
    (b) providing a verifying circuit, comprising first and second counters and gating means, such that said first counter is connected to receive electrical pulses generated in response to said meter device functioning in a measuring operation, and said second counter is connected to receive electrical pulses generated in response to said standard measuring means functioning in a measuring operation;
    (c) simultaneously gating said first and second counters, by said gating means, as said meter device and said standard measuring means so function, such that said first and second counters are simultaneously disposed to receive said respective pulses and subsequently simultaneously isolated therefrom; and
    (d) obtaining the ratio of the number of electrical pulses counted by said second counter to the number of electrical pulses counted by said first counter while said counters so simultaneously received said respective electrical pulses.

11. A method as defined in claim 10 further comprising the additional step of multiplying said ratio by the meter factor of said standard measuring means.

12. A method as defined in claim 10 wherein said meter device is a fluid flow meter installed to measure fluid flow along a pipeline, and said standard measuring means is installed in-line along said pipeline for so obtaining said meter factor.

* * * * *